US008937680B2

(12) United States Patent
Higashitsutsumi

(10) Patent No.: US 8,937,680 B2
(45) Date of Patent: Jan. 20, 2015

(54) IMAGE PICKUP UNIT AND IMAGE PROCESSING UNIT FOR IMAGE BLUR CORRECTION

(75) Inventor: Yoshihito Higashitsutsumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 158 days.

(21) Appl. No.: 13/695,946

(22) PCT Filed: Apr. 28, 2011

(86) PCT No.: PCT/JP2011/060467
§ 371 (c)(1), (2), (4) Date: Nov. 2, 2012

(87) PCT Pub. No.: WO2011/142282
PCT Pub. Date: Nov. 17, 2011

(65) Prior Publication Data
US 2013/0050543 A1    Feb. 28, 2013

(30) Foreign Application Priority Data
May 12, 2010   (JP) ................ 2010-110368

(51) Int. Cl.
H04N 5/232   (2006.01)
H04N 5/228   (2006.01)
H04N 5/76    (2006.01)
G06T 5/00    (2006.01)
H04N 5/357   (2011.01)

(52) U.S. Cl.
CPC .............. *H04N 5/232* (2013.01); *G06T 5/003* (2013.01); *H04N 5/23212* (2013.01); *G06T 2207/30208* (2013.01); *H04N 5/23245* (2013.01); *H04N 5/3572* (2013.01)
USPC ............ 348/349; 348/231.6; 348/208.99; 348/222.1

(58) Field of Classification Search
CPC ......................... H04N 5/23212; H04N 9/045
USPC ......... 348/345, 349, 222.1, 234, 241, 208.99, 348/231.6
See application file for complete search history.

(56) References Cited

U.S. PATENT DOCUMENTS

2007/0268376 A1* 11/2007 Yoshikawa et al. ........ 348/222.1
2009/0080790 A1*  3/2009 Hasegawa ................... 382/260
2011/0199514 A1*  8/2011 Tamura ....................... 348/241

FOREIGN PATENT DOCUMENTS

| JP | 2003-287505 A | 10/2003 |
| JP | 2007-206738 A | 8/2007 |
| JP | 2008-042874 A | 2/2008 |
| WO | WO-2006/022373 A1 | 3/2006 |

OTHER PUBLICATIONS

Japanese Office Action issued May 1, 2013 for corresponding Japanese Application No. 2010-110368.

* cited by examiner

*Primary Examiner* — Nhan T Tran
(74) *Attorney, Agent, or Firm* — Rader, Fishman & Grauer PLLC

(57) ABSTRACT

An image pickup unit and an image processing unit are provided, each inexpensively achieving both of far distance photographing and near distance photographing in a simple configuration. In an image processing section 12, a correction coefficient selection section 123 selects one of a correction coefficient k1 for a distant object and a correction coefficient k2 for a proximate object in response to a mode setting signal input by a user, and outputs the selected correction coefficient to a deblurring processing section 122. The deblurring processing section 122 performs blur correction to image data D2 based on imaging data D0 with use of the selected correction coefficient. This allows appropriate blur correction to the imaging data of each of the distant object and the proximate object.

16 Claims, 6 Drawing Sheets

(A)

FAR-POINT PSF (B)

(C)

(A)

NEAR-POINT PSF (B)

(C)

(A)

(B)

(A)

(B)

IMAGE PICKUP UNIT AND IMAGE PROCESSING UNIT FOR IMAGE BLUR CORRECTION

TECHNICAL FIELD

The present invention relates to an image pickup unit and an image processing unit, which are preferably mounted in a portable electronic apparatus, for example.

BACKGROUND ART

Along with recent widespread of camera mobile phones, there is an increasing demand for a camera that allows data recognition and data input with near distance photographing, for example, through two-dimensional barcode such as QR (Quick response) code or OCR (Optical Character Recognition) for a calling card.

In such a camera, photographing (near distance photographing) is necessary to be performed at a short object distance (distance to a subject) during data recognition. Hence, for example, an autofocus lens or a two-level focus-switchable lens is used as a photographing optical system in order to perform both normal photographing (photographing of a distant object) and the near distance photographing.

SUMMARY OF THE INVENTION

However, in the case where the autofocus lens or the focus switchable lens as described above is used, an actuator, a focus determination circuit, and other components are further necessary, thereby leading to an increase in the number of components and in cost. In addition, there is a technique of Extended depth of field (EDOF). In the EDOF technique, however, it is difficult to focus on a near point to the extent that barcode reading and/or OCR recognition is allowable. It is therefore desired to achieve not only the normal photographing (focusing on a far point) but also the near distance photographing (focusing on a near point) for barcode reading and/or OCR recognition inexpensively in a simple configuration.

The invention has been made in light of such a problem, and an object of the invention is to provide an image pickup unit and an image processing unit, each achieving both of far distance photographing and near distance photographing inexpensively in a simple configuration.

The image pickup unit of the invention includes an image pickup lens, an image pickup device acquiring imaging data based on light rays passing through the image pickup lens, and an image processing section performing image processing to a picked-up image based on the imaging data. The image processing section includes a deblurring processing section performing blur correction to a picked-up image, and a correction coefficient selection section that selects one of a plurality of blur correction coefficients set depending on object distances from the image pickup lens to a subject, and outputs the selected blur correction coefficient to the deblurring processing section.

The image processing unit of the invention includes a deblurring processing section performing blur correction to a picked-up image that is acquired by an image pickup device based on light rays passing through an image pickup lens, and a correction coefficient selection section that selects one of a plurality of blur correction coefficients set depending on object distances from the image pickup lens to a subject, and outputs the selected correction coefficient to the deblurring processing section.

In the image pickup unit and the image processing unit of the invention, the correction coefficient selection section selects one of the plurality of blur correction coefficients set depending on the object distances, and the deblurring processing section performs blur correction to imaging data using the selected correction coefficient. One correction coefficient is selectable from the plurality of correction coefficients (for example, correction coefficients for a proximate object and a distant object), thereby allowing appropriate blur correction to be performed to each piece of imaging data with different object distances (for example, imaging data of a distant object and imaging data of a proximate object).

According to the image pickup unit and the image processing unit of the invention, blur correction is performed using one blur correction coefficient selected from the plurality of blur correction coefficients set depending on object distances, thereby allowing appropriate blur correction to be performed to each piece of imaging data with different object distances, such as imaging data of a proximate object and imaging data of a distant object. This enables focusing on both of a far point and a near point without a special image pickup optical system such as an autofocus lens and a focus switching lens. Consequently, both far distance photographing and near distance photographing are achieved inexpensively in a simple configuration.

BRIEF DESCRIPTION OF THE DRAWINGS

FIG. 8(A) illustrates an example of the photographed QR code before deblurring processing and FIG. 8(B) illustrates an example of the photographed QR code after deblurring processing.

MODE(S) FOR CARRYING OUT THE INVENTION

Hereinafter, an embodiment of the present invention will be described with reference to drawings. It is to be noted that description is made in the following order.

1. Embodiment (an example of an image pickup unit performing deblurring processing while switching filters between a far-point correction filter and a near-point correction filter).

2. Modification 1 (an example of performing deblurring processing to imaging data acquired with lines being thinned).

3. Modification 2 (an example of performing deblurring processing to specific color components (G and/or B)).

4. Other Modifications

[Embodiment]

[Overall Configuration of Image Pickup Unit 1]

Figure 1:
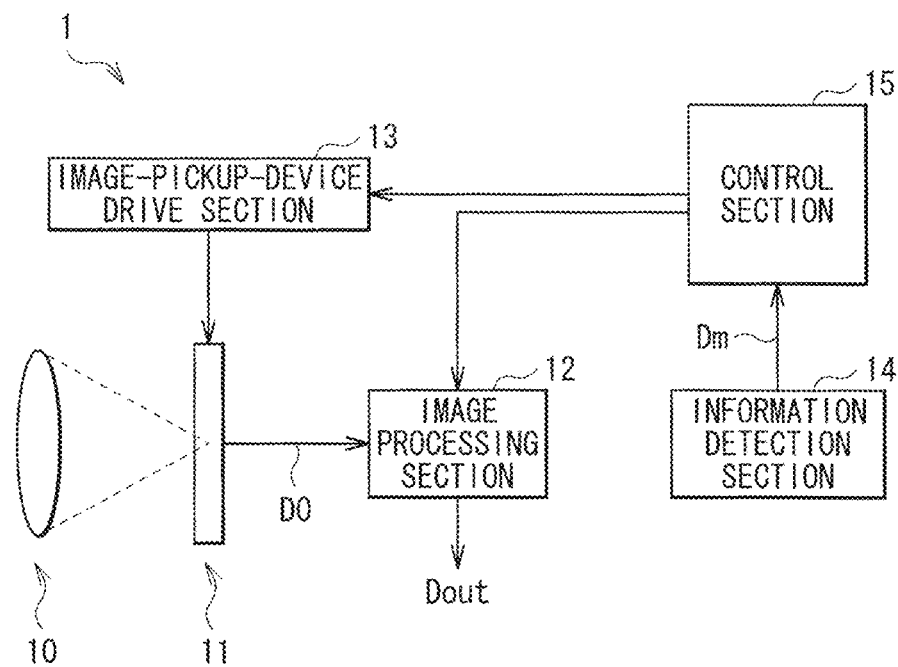
FIG. 1 is a functional block diagram illustrating a schematic configuration of an image pickup unit according to an embodiment of the invention.

FIG. 1 is a functional block diagram of an image pickup unit (image pickup unit 1) according to an embodiment of the invention. The image pickup unit 1 includes an image pickup lens 10, an image pickup device 11, an image processing section 12, an image-pickup-device drive section 13, an information detection section 14, and a control section 15. The image pickup unit 1 is mounted in, for example, a camera mobile phone, and is switchable between a mode of proximately photographing two-dimensional barcode such as QR code (macro photographing mode) and a mode of photographing a distant object (normal photographing mode). In this embodiment, far distance photographing in which a subject exists at a far point is assumed in the normal photographing mode. On the other hand, near point photographing in which a subject exists at a near point is assumed in the macro photographing mode.

The image pickup lens 10 is a main lens used for imaging an object (subject), and includes a typical fixed-focus lens used in a video camera and a still camera, for example. An undepicted aperture diaphragm and an undepicted shutter are provided in the vicinity of the pupil plane of the image pickup lens 10.

The image pickup device 11, which is a photoelectric conversion device that accumulates electricity based on received light rays, acquires imaging data (imaging data D0 described later) based on light rays passing through the image pickup lens 10, and outputs the acquired imaging data to the image processing section 12. The image pickup device 11 is configured of, for example, a solid image pickup device such as CMOS (Complementary Metal Oxide Semiconductor) and CCD (Charge Coupled Device), in which a plurality of unit pixels are arranged in arrays. Hereinafter, description is made with an exemplary case where the image pickup device 11 is configured of a CMOS sensor in which data reading is line-sequentially performed.

Figure 2:
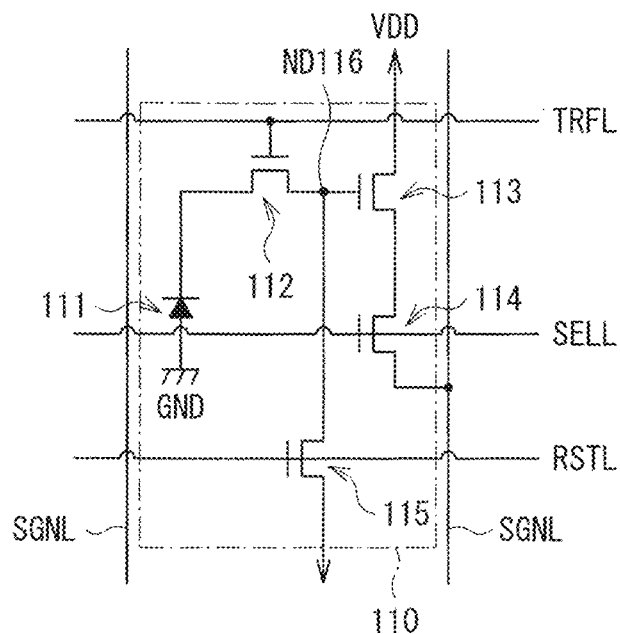
FIG. 2 is a circuit diagram illustrating an exemplary unit pixel of an image pickup device illustrated in FIG. 1.

In the image pickup device 11, a transfer selection line, a reset line, and a select line are wired to each row of the pixel arrangement, and a signal line is wired to each column of the pixel arrangement. FIG. 2 illustrates a circuit configuration of a unit pixel of the image pickup device 11. For example, a unit pixel 110 includes a photodiode 111, a transfer transistor 112, an amplifier transistor 113, a select transistor 114, a reset transistor 115, and a floating node ND 116.

The photodiode 111 performs photoelectric conversion of incident light into signal charge (for example, electrons) having a charge amount corresponding to the light quantity of the incident light, and accumulates the signal charge. A source and a drain of the transfer transistor 112 are connected to a cathode of the photodiode 111 and the floating node ND 116, respectively, and a gate thereof is connected to the transfer selection line TRFL. The transfer transistor 112 has a function of transferring the signal charge accumulated in the photodiode 111 to the floating node ND 116 when the transfer transistor 112 is conductive (ON). The amplifier transistor 113 and the select transistor 114 are connected in series between source potential VDD and the signal line SGNL. The amplifier transistor 113 is connected at its gate to the floating node ND 116, and amplifies potential of the floating node ND 116 and outputs the amplified potential to the signal line SGNL through the select transistor 114. The gate of the select transistor 114 is connected to the select line SELL. The reset transistor 115, of which a source is connected to the floating node ND 116, a drain is connected to a predetermined potential line, and a gate is connected to the reset line RSTL, has a function of resetting the potential of the floating node ND 116.

Figures 3, 4:
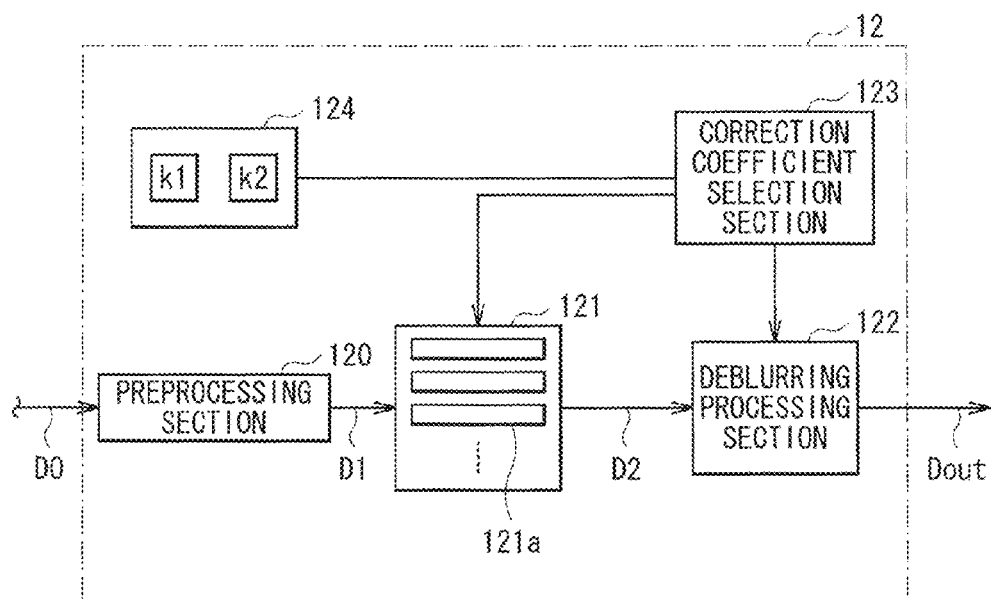
FIG. 3 is a schematic diagram illustrating an exemplary color arrangement in a color filter.
FIG. 4 is a functional block diagram illustrating a detailed configuration of an image processing section illustrated in FIG. 1.

A color filter having a predetermined color arrangement is provided on a light receiving surface of the image pickup device 11 as described above. FIG. 3 illustrates an example of the color filter having Bayer arrangement. As illustrated in the drawing, Bayer arrangement including two pieces of green (G), one piece of red (R), and one piece of blue (B) among three primary colors is used in the embodiment. In the Bayer arrangement, luminance resolution is stressed rather than color resolution.

It is to be noted that an undepicted preprocessing section may be provided in an output stage of the image pickup device 11. In such a case, the preprocessing section performs sampling processing and quantization processing to an analog signal read from the image pickup device 11 to convert the analog signal into a digital signal (A/D conversion), and outputs the digital signal to the image processing section 12. The function of the preprocessing section is allowed to be provided in the image pickup device 11 itself.

The image processing section 12 performs predetermined image processing including blur correction processing (deblurring processing) to the imaging data (imaging data D0) supplied from the image pickup device 11. The specific configuration of the image processing section 12 is described later.

The image-pickup-device drive section 13 performs drive control such as light reception operation and reading operation of the image pickup device 11.

The information detection section 14 detects a setting signal (mode setting signal) of a photographing mode of the image pickup unit 1. The mode setting signal is input by, for example, a user through operation of a button, a key, a switch, and the like of a mobile phone, for example. In the embodiment, a user selects, as a photographing mode, one of the normal photographing mode for far distance photographing and the macro photographing mode for near distance photographing (switches between the normal and macro photographing modes). The information detection section 14 outputs its detection result in a form of a mode setting signal Dm to the control section 15. The control section 15 controls image processing operation of the image processing section 12 depending on a selected photographing mode. Although an object distance from the image pickup lens to a subject varies depending on photographing modes, the control as described above allows the image processing section 12 to perform selection of (switching to) appropriate correction coefficient depending on the object distance.

The control section 15 performs drive control of the image-pickup-device drive section 13, the image processing section 12, and the information detection section 14, and is configured of, for example, a microcomputer.

(Configuration of Image Processing Section 12)

FIG. 4 illustrates an example of the image processing section 12. The image processing section 12 includes, for example, a preprocessing section 120, a storage section 121, a deblurring processing section 122, a correction coefficient selection section 123, and a holding section 124. It is to be noted that the image processing section 12 corresponds to a specific example of the image processing unit of the invention.

The preprocessing section 120 performs various types of image processing, including, for example, defect correction processing, noise removal processing, white balance adjustment processing, shading correction processing, and Y/C separation processing, to the imaging data D0, and outputs such processed imaging data (imaging data D0 to the storage section 121.

The storage section 121 is a memory that temporarily stores the imaging data D1 output from the preprocessing section 120 for deblurring processing in a subsequent stage. Either a stationary disk or a removal disk may be used as a storage means of the storage section 121. In addition, various types of storage means may be used, including magnetic disks, optical disks, magneto-optical disks, and semiconductor memories. The image data stored in the storage section 121 is output in a form of image data D2 to the deblurring processing section 122 in response to control by the correction coefficient selection section 123.

In the embodiment, the storage section 121 includes a plurality of line memories 121a in which image data based on the imaging data D0 is stored for predetermined lines. The number of the line memories 121a (the number of lines) is set depending on a size of a correction coefficient used in the deblurring processing section 122. Since the correction coefficient is an inverse function of PSF, its size (two-dimensional spread) varies depending on object distances (photographing modes), as described in detail later. Specifically, a filter size during deblurring processing described later varies between the correction coefficients, and the number of lines of the line memories 121a is set to a number corresponding to the filter size during the relevant deblurring processing.

The deblurring processing section 122 performs blur correction processing (deblurring processing) to the imaging data supplied from the storage section 121. Specifically, the deblurring processing section 122 performs deblurring processing through filtering using a correction coefficient (correction coefficient k1 or k2) supplied from the correction coefficient selection section 123, and outputs the deblurred image data Dout.

The correction coefficient selection section 123 selects one of the plurality of correction coefficients for blur correction based on control by the control section 15, and outputs the selected correction coefficient to the deblurring processing section 122. The plurality of correction coefficients, which are prepared for each of a plurality of different photographing modes, are different from each other depending on object distances. In the embodiment, two correction coefficients, or the correction coefficient k1 for the normal photographing mode and the correction coefficient k2 for the macro photographing mode, are used as such correction coefficients. The correction coefficient k1 is a correction coefficient for performing appropriate deblurring processing to imaging data of a distant object, and the correction coefficient k2 is a correction coefficient for performing appropriate deblurring processing to imaging data of a proximate object. The correction coefficients k1 and k2 are each an inverse function of a point spread function (PSF), for example.

When a focus position on the light receiving surface of the image pickup device 11 is defined as f(x, y), and an actual image-forming position is defined as g(x, y), the PSF function is a function h(x, y) given by the following expression (1). In other words, the correction coefficients k1 and k2 are each a function given by the following expression (2).

$$f(x,y) \times h(x,y) = g(x,y) \quad (1)$$

$$1/h(x,y) \quad (2)$$

The holding section 124 is a memory holding the correction coefficients k1 and k2 as described above, and includes a storage means similar to that of the storage section 121. It is to be noted that although the correction coefficients k1 and k2 may be beforehand held in a memory in the circuit in the above way, they may be externally input through the information detection section 14.

[Function and Effect of Image Pickup Unit 1]

Figure 5:
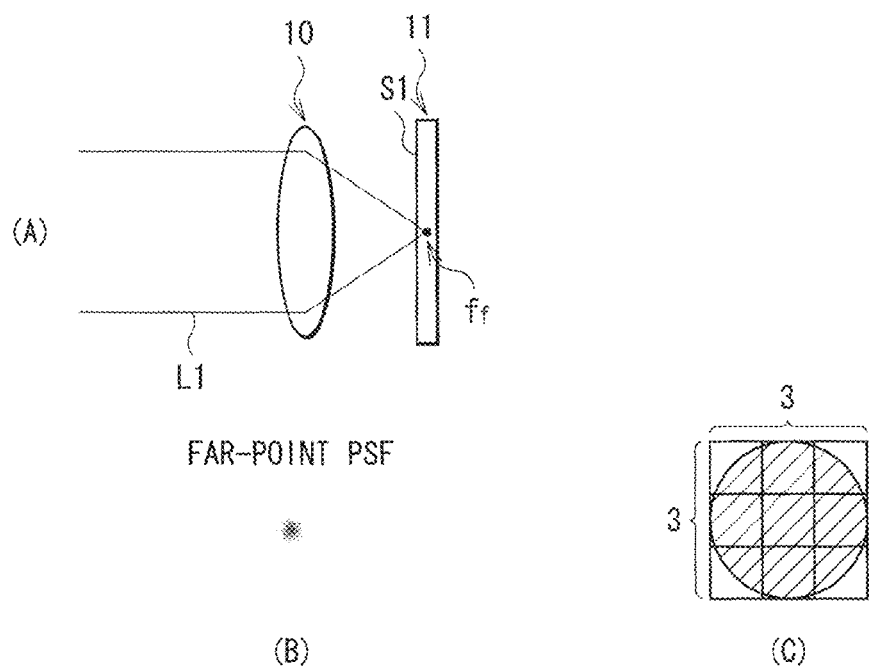
FIG. 5(A) illustrates a state of light ray acquisition in far distance photographing.
FIG. 5(B) illustrates a far-point PSF function.
FIG. 5(C) illustrates kernel size of a far-point correction filter.

FIG. 5(A) schematically illustrates a state of acquiring light rays in the normal photographing mode. As illustrated in the drawing, in the image pickup unit 1, for example, light rays L1 from an object (subject) pass through the image pickup lens 10 and then arrive at the image pickup device 11 in the normal photographing mode. The image pickup device 11 line-sequentially reads light receiving signals according to control by the image-pickup-device drive section 13, and thus acquires the imaging data D0 (imaging data of a distant object). The acquired imaging data D0 is supplied to the image processing section 12 that then performs predetermined image processing to the imaging data D0, and outputs the processed data in a form of image data Dout.

In the embodiment, the image processing section 12 performs the following deblurring processing to the imaging data D0 based on a mode setting signal Dm input through the information detection section 14.

(1. Preprocessing)

Specifically, first, the preprocessing section 120 performs, as preprocessing of the deblurring processing, various types of image processing including, for example, defect correction processing, noise removal processing, white balance adjustment processing, shading correction processing, and Y/C separation processing. In detail, the defect correction processing is processing of correcting a defect (defect due to abnormality of the image pickup device 11 itself) contained in the imaging data D0. The noise removal processing is processing of removing noise (for example, noise generated during imaging at a dark place or a place with lack of sensitivity) contained in the imaging data. The white balance adjustment processing is processing of adjusting color balance disrupted due to individual differences of devices such as differences in transmission characteristics of the color filter and/or in spectral sensitivity of the image pickup device 11, and/or due to illumination conditions. The shading correction processing is processing of correcting unevenness of a luminance level in a picked-up image plane. The Y/C separation processing is processing of separating a luminance signal (Y) from a chroma signal (C). In addition, processing (clamp processing) of setting a black level of each pixel data and/or color interpolation processing such as demosaic processing may be performed. Imaging data subjected to such processing is output in a form of image data D1 to the storage section 121.

(2. Setting of Line Memories)

The storage section 121 stores and temporarily holds the image data D1 input from the preprocessing section 120 in the line memories 121a including a predetermined number of lines in correspondence to the filter size during deblurring processing using the correction coefficient k1 or k2 in a subsequent stage.

Here, the number of lines of the line memories 121a is set in the storage section 121, for example, in the following manner in order to meet any deblurring processing using any correction coefficient in correspondence to the size of the correction coefficient k1 or k2 to be used. Specifically, as illustrated in FIG. 5(A), since an image forming point $f_f$ of an object is located in the vicinity of the light receiving surface 51 of the image pickup device 11 in the normal photographing mode, the PSF function (far-point PSF) of the object image has a narrow two-dimensional spread (FIG. 5(B)). As a result, filter size is relatively small (for example, 3×3 kernel illustrated in FIG. 5(C)) for deblurring processing using the correction coefficient k1 as an inverse function of that PSF function. In other words, since a level of "blur" in a picked-up image is relatively low in the normal photographing mode, a relatively small filter size may be used in the mode.

Figure 6:
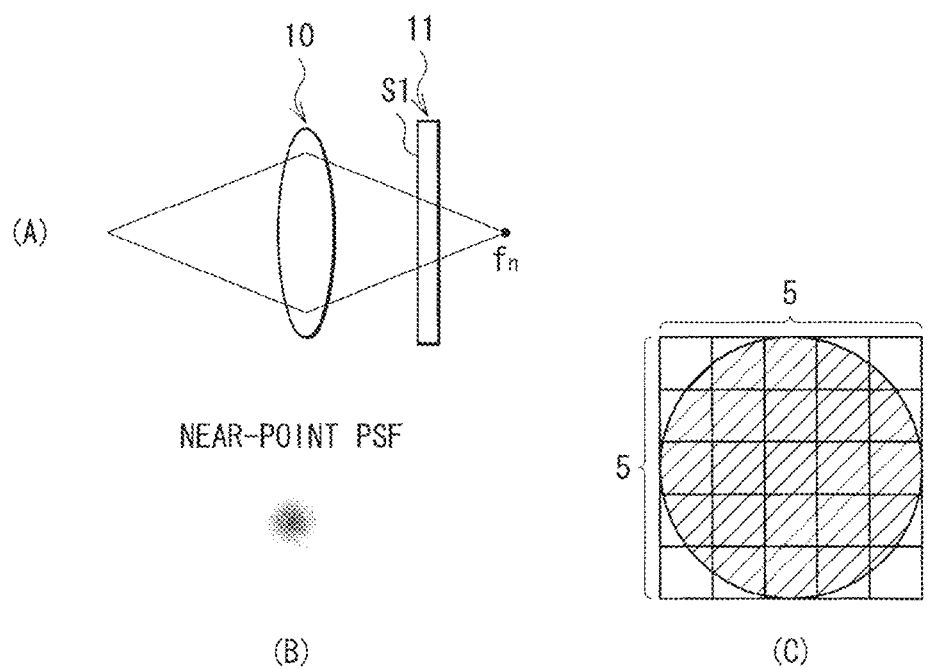
FIG. 6(A) illustrates a state of light ray acquisition in near distance photographing.
FIG. 6(B) illustrates a near-point PSF function.
FIG. 6(C) illustrates kernel size of a near-point correction filter.

On the other hand, FIG. 6(A) schematically illustrates a state of acquiring light rays in the macro photographing mode. In this case, since an image forming point $f_n$ of an object is away from the light receiving surface S1 of the image pickup device 11, the PSF function (near-point PSF) of the object image has a wide two-dimensional spread compared with the far-point PSF (FIG. 6(B)). As a result, filter size is relatively large (for example, 5×5 kernel illustrated in FIG. 6(C)) for deblurring processing using the correction coefficient k2 as an inverse function of that PSF function. In other words, since a level of "blur" in a picked-up image is relatively high in the macro photographing mode, a relatively large filter size is correspondingly used in the mode. Hence, five line memories 121a are provided herein in consideration of the deblurring processing in the macro photographing mode (deblurring processing using the correction coefficient k2).

(3. Selection (Switching) of Correction Coefficient)

In the embodiment, the correction coefficient selection section 123 selects an appropriate correction coefficient depending on a relevant object distance between the correction coefficients k1 and k2 held in the holding section 124 in response to control by the control section 15 based on the mode setting signal Dm, and outputs the selected correction coefficient to the deblurring processing section 122. Specifically, in the case where the mode setting signal Dm selects the normal photographing mode, the correction coefficient selection section 123 selects the correction coefficient k1 for a distant object. On the other hand, in the case where the mode setting signal Dm selects the macro photographing mode, the correction coefficient selection section 123 selects the correction coefficient k2 for a proximate object. Consequently, for example, if the mode setting signal indicating setting of the macro photographing mode is detected in the normal photographing mode, the correction coefficient k1 is switched to the correction coefficient k2. Similarly, if the mode setting signal indicating setting of the normal photographing mode is detected in the macro photographing mode, the correction coefficient k2 is switched to the correction coefficient k1. The selected correction coefficient k1 (or the correction coefficient k2) is output to the deblurring processing section 122.

Figure 7:
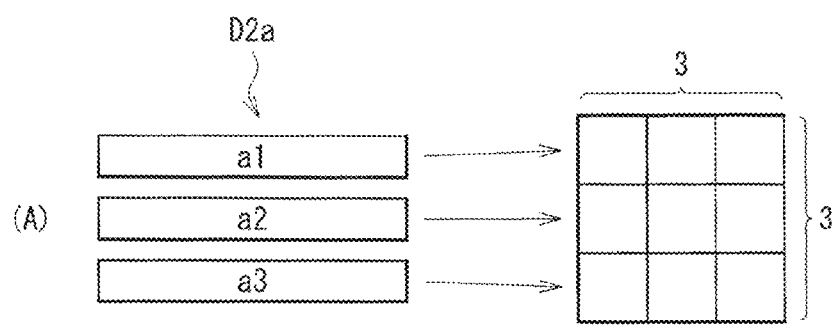
FIG. 7 is a schematic diagram for explaining part of deblurring processing operation of the image processing section illustrated in FIG. 1.
Figure 7:
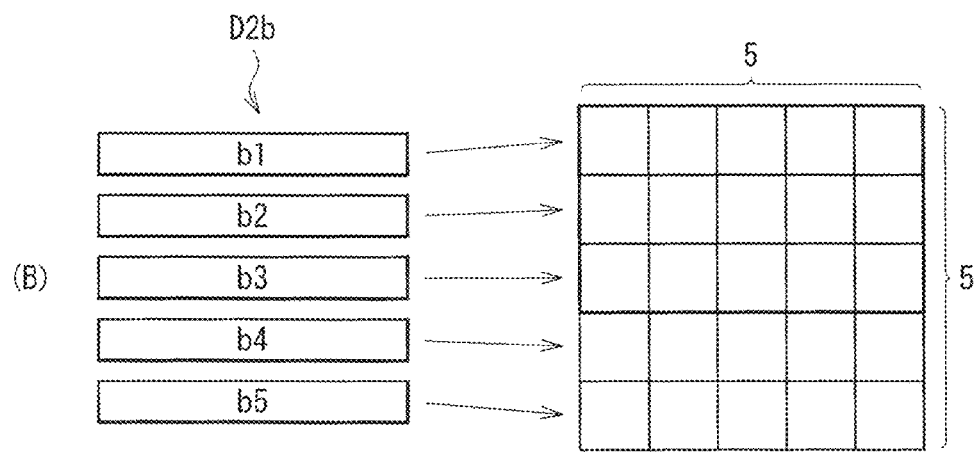

In addition, the correction coefficient selection section 123 controls the storage section 121 to output the image data D2 for the number of lines corresponding to the correction coefficient to be selected (corresponding to the filter size during deblurring processing) to the deblurring processing section 122. Specifically, as illustrated in FIG. 7(A), in the case of the normal photographing mode, the correction coefficient selection section 123 controls the storage section 121 to output pixel data D2a, as the image data D2, for three lines (a1 to a3) in correspondence to the 3×3 filter size to the deblurring processing section 122. On the other hand, as illustrated in FIG. 7(B), in the case of the macro photographing mode, the correction coefficient selection section 123 controls the storage section 121 to output pixel data D2b, as the image data D2, for five lines (b1 to b5) in correspondence to the 5×5 filter size to the deblurring processing section 122.

(4. Deblurring Processing Using Correction Coefficient)

The deblurring processing section 122 performs deblurring processing to the image data D2 for the predetermined lines supplied from the storage section 121 with use of the correction coefficient supplied from the correction coefficient selection section 123. Specifically, in the case of the normal photographing mode, the deblurring processing section 122 performs blur correction by multiplying the image data D2 for three lines by the correction coefficient k1. On the other hand, in the case of the macro photographing mode, the deblurring processing section 122 performs blur correction by multiplying the image data D2 for five lines by the correction coefficient k2. According to such deblurring processing, blur is satisfactorily reduced in a picked-up image corresponding to the image data D2, and image data Dout is output while being focused on a subject (in focus).

As described above, in the embodiment, the image processing section 12 selects one of the correction coefficient k1 for a distant object and the correction coefficient k2 for a proximate object based on the mode setting signal Dm, and performs deblurring processing to the imaging data D0 based on the selected correction coefficient. In this way, the image processing section 12 is allowed to perform appropriate blur correction to the imaging data of each of the distant and proximate objects only by selecting one of (switching the coefficient between) the correction coefficients k1 and k2 as a correction coefficient used in the deblurring processing. This enables focusing on both of a far point and a near point without a special image pickup optical system such as an autofocus lens and a focus switching lens, for example. Consequently, both far distance photographing and near distance photographing are inexpensively achieved in a simple configuration.

Figure 8:
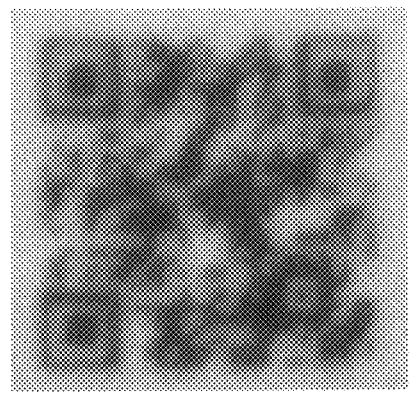
FIG. 8 illustrates examples of a photographed QR code, where
Figure 8:
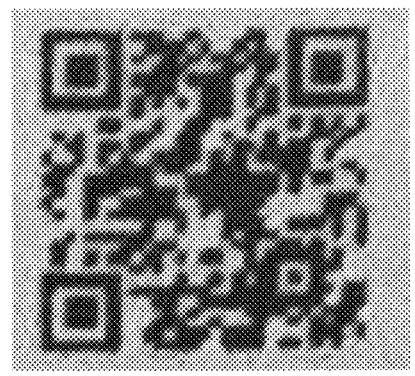

For example, when a user sets the normal photographing mode in an electronic apparatus in which the image pickup unit 1 is mounted, for example, a scene is photographed, and deblurring processing is performed with use of the correction coefficient k1. On the other hand, when a user sets the macro photographing mode, two-dimensional barcode such as QR code is photographed, and deblurring processing is performed with use of the correction coefficient k2. FIG. 8(A) illustrates an example of a photographed QR code before deblurring processing and FIG. 8(B) illustrates an example of the photographed QR code after deblurring processing. In this way, blur is adequately corrected by the deblurring processing, allowing an image focused on a near point to be produced.

Modifications (Modifications 1 and 2) of the embodiment are now described. Hereinafter, components similar to those in the embodiment are designated by the same numerals, and description of them is appropriately omitted.

[Modification 1]

Figure 9:
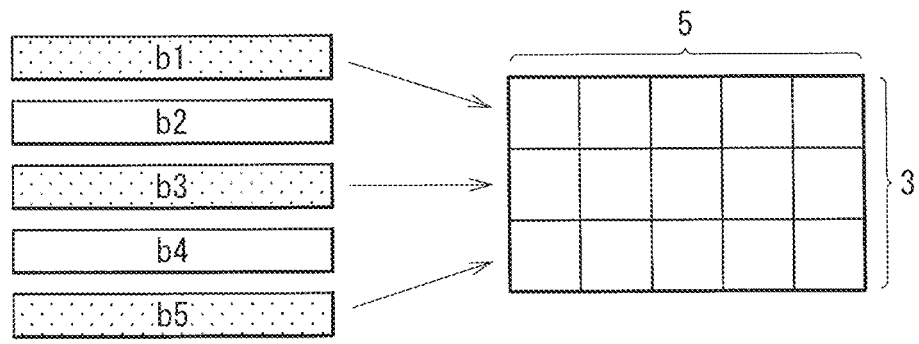
FIG. 9 is a schematic diagram for explaining deblurring processing operation according to Modification 1.

FIG. 9 is a schematic diagram for explaining deblurring processing operation according to Modification 1. In the embodiment, the number of lines of the line memories has been set in correspondence to the filter size corresponding to the correction coefficient. Specifically, the number of lines has been set to five in correspondence to the correction coefficient k2 demanding a larger filter size to allow the line memories to be used for the deblurring processing with any of the correction coefficients k1 and k2. The number of lines of the line memories, however, may be reduced to reduce the filter size.

For example, the number of lines of the line memories may be set to three in correspondence to the filter size (3×3) for the normal photographing mode (case of using the correction coefficient k1). In this case, although line memories for five lines are originally demanded in the macro photographing mode as described above, line memories for two lines are thinned from that, thereby line memories for three lines are allowed to meet the macro photographing mode. In detail, as illustrated in FIG. 9, predetermined lines (b2 and b4) are thinned from pixel data for five lines (b1 to b5) (data are written into the line memories every other line), thereby pixel data for three lines (b1, b3, and b5) are to be deblurred. As a result, line memories for two lines are thinned in a vertical direction (pixels in a horizontal direction (line direction) are not thinned), and therefore deblurring processing is allowed to be performed with a filter size of 3×5.

In this way, the number of lines of the line memories in the storage section 121 may not be necessarily associated with the macro photographing mode having a larger filter size. The macro photographing mode is a photographing mode mainly used for data recognition such as reading of QR code; hence, a picked-up image may only have a resolution high enough to recognize such data. The data may be therefore held in the line memories of the storage section 121 while predetermined lines are thinned as in this Modification. According to such a configuration, the same effects as those in the embodiment are also obtained, and filter size during deblurring processing may be reduced compared with that in the embodiment.

It is to be noted that the number of lines of the line memories in the storage section 121 may be a number other than "five" and "three" described above without limitation. The number of lines may be appropriately set depending on size of PSF of a correction coefficient to be used, for example.

The reduction in the number of lines of the line memories (reduction in filter size) is also achieved not only by the technique of thinning of pixel data as described above, but also by mixing of pixel data to each other in the image pickup device 11 or digital processing including addition of pixel data to each other, for example.

[Modification 2]

Figure 10:
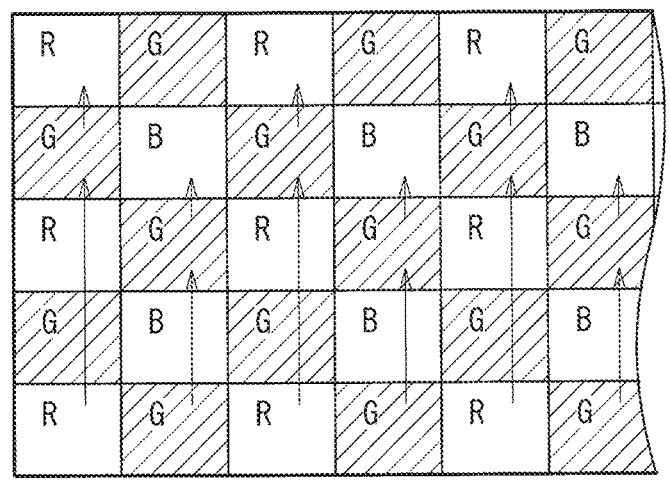
FIG. 10 is a schematic diagram, according to Modification 2, for explaining differences in image forming positions between types of color light.

In the above-described embodiment, since a color filter including filters of three primary colors R, G, and B being arranged is provided on the light receiving surface of the image pickup device 11, all pixel data of the three colors are to be deblurred. Only a specific color component, however, may be to be deblurred as described below. For example, if the color filter has Bayer arrangement as its color arrangement, only a green color component providing relatively high resolution may be to be deblurred. In this case, for example, as illustrated in FIG. 10, pixel data are rearranged such that only G data are arranged among the pixel data arranged in correspondence to color arrangement of the color filter, and thus the number of lines is allowed to be reduced (to half).

Figure 11:
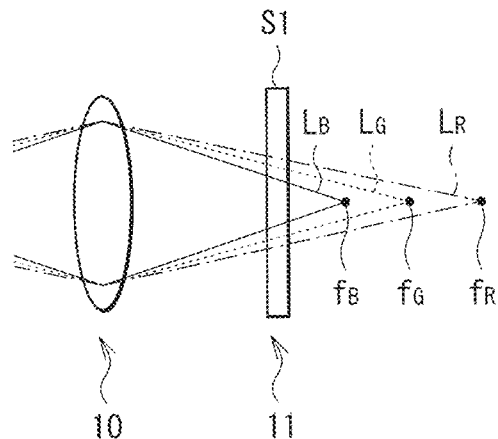
FIG. 11 is a schematic diagram for explaining deblurring processing operation according to the Modification 2.

Alternatively, as illustrated in FIG. 11, there are differences in image forming positions ($f_B$, $f_G$, and $f_R$) between types of color light, i.e., blue light $L_B$, green light $L_G$, and red light $L_R$ in the case of near distance photographing, and focusing is most readily adjusted in the blue light $L_B$ among them. Thus, only the blue component in the imaging data D0 may be to be deblurred. It is to be note that pixel data are also rearranged in this case such that only B data are arranged, thereby the number of lines is allowed to be reduced, as in the case of using only the green component described above.

In addition, the blue component and the green component may be to be deblurred together. In this case, while the color filter with Bayer arrangement has lines of data arrangement of "R, G, R, G, ..." and lines of data arrangement of "G, B, G, B, ...", only latter lines can be selectively stored in the line memories.

[Other Modifications]

Although the invention has been described with the embodiment and the Modifications, the invention should not be limited thereto, and various modifications or alterations thereof may be made. For example, although two photographing modes, i.e., the normal photographing mode and the macro photographing mode, are switched from each other so that two correction coefficients corresponding to the photographing modes are allowed to be switched from each other in the embodiment and the Modifications, the number of the photographing modes and the number of corresponding correction coefficients may be three or more.

In addition, although the Modifications 1 and 2 have been described with a case where the predetermined lines are thinned from the imaging data D0 for deblurring processing, and a case where only a specific color component between pixel data of R, G, and B are to be deblurred, a luminance signal after Y/C separation may be also to be deblurred. In this case, for example, only a relevant luminance component may be preferably stored in the line memories of the storage section 121 at a predetermined number of lines after the preprocessing section 120 of the image processing section 12 performs Y/C separation processing to separate a luminance signal (Y) from a color signal (C).

The invention claimed is:

1. An image pickup unit, comprising:
   an image pickup lens;
   an image pickup device, configured to acquire imaging data based on light rays passing through the image pickup lens; and
   an image processing section configured to perform image processing to a picked-up image based on the imaging data,
   wherein the image processing section includes:
   a storage section, including a plurality of line memories, configured to store the imaging data in a plurality of line memories to hold the imaging data; and
   a correction coefficient selection section configured to select one of a plurality of blur correction coefficients, from a holding section, depending on object distances from the image pickup lens to a subject, and to output a selected blur correction coefficient to a deblurring processing section, wherein
   the deblurring processing section is configured to perform blur correction to the picked-up image, from the storage section, using the selected blur correction coefficient selected by the correction coefficient selection section, and to output a deblurred image; and
   a number of line memories in the storage section is set depending on a size of the selected blur correction coefficient used in the deblurring processing section.

2. The image pickup unit, according to claim 1, wherein the plurality of blur correction coefficients include at least a first correction coefficient for a proximate object and a second correction coefficient for a distant object.

3. The image pickup unit, according to claim 1, wherein the plurality of blur correction coefficients are each an inverse function of a point spread function.

4. The image pickup unit according to claim 1,
   wherein the storage section stores the imaging data in the plurality of line memories while thinning pixel data for predetermined lines from the imaging data.

5. The image pickup unit according to claim 1,
wherein the imaging data contains signals of three colors of red, green, and blue, and
the deblurring processing section performs blur correction only to a specific color signal among the imaging data.

6. The image pickup unit according to claim 5, wherein the specific color signal is one or both of the blue signal and the green signal.

7. The image pickup unit according to claim 1,
wherein the imaging data is separated into a luminance signal and a color signal, and
the deblurring processing section performs blur correction only to the separated luminance signal.

8. The image pickup unit according to claim 1, wherein the correction coefficient selection section selects the one correction coefficient based on an externally input mode setting signal.

9. An image processing unit comprising:
a storage section, including a plurality of line memories, configured to store the imaging data in a plurality of line memories to hold the imaging data; and
a correction coefficient selection section configured to select one of a plurality of blur correction coefficients, from a holding section, depending on object distances from the image pickup lens to a subject, and to output a selected blur correction coefficient to a deblurring processing section, wherein
the deblurring processing section is configured to perform blur correction to the picked-up image, from the storage section, using the selected blur correction coefficient selected by the correction coefficient selection section, and to output a deblurred image; and
a number of line memories in the storage section is set depending on a size of the selected blur correction coefficient used in the deblurring processing section.

10. The image processing unit, according to claim 9, wherein the plurality of blur correction coefficients include at least a first correction coefficient for a proximate object and a second correction coefficient for a distant object.

11. The image processing unit, according to claim 9, wherein the plurality of blur correction coefficients are each an inverse function of a point spread function.

12. The image processing unit, according to claim 9, wherein the storage section stores the imaging data in the plurality of line memories while thinning pixel data for predetermined lines from the imaging data.

13. The image processing unit, according to claim 9,
wherein the imaging data contains signals of three colors of red, green, and blue, and
the deblurring processing section performs blur correction only to a specific color signal among the imaging data.

14. The image processing unit, according to claim 13, wherein the specific color signal is one or both of the blue signal and the green signal.

15. The image processing unit, according to claim 9,
wherein the imaging data is separated into a luminance signal and a color signal, and
the deblurring processing section performs blur correction only to the separated luminance signal.

16. The image processing unit, according to claim 9, wherein the correction coefficient selection section selects the one correction coefficient based on an externally input mode setting signal.

* * * * *